Oct. 21, 1941.  R. B. DEXTER  2,259,460

RESILIENT DRIVE BUSHING

Filed April 17, 1939

Reynolds B. Dexter
INVENTOR.

BY Lyon & Lyon
ATTORNEYS

Patented Oct. 21, 1941

2,259,460

UNITED STATES PATENT OFFICE 2,259,460

RESILIENT DRIVE BUSHING

Reynolds B. Dexter, Los Angeles, Calif.

Application April 17, 1939, Serial No. 268,214

15 Claims. (Cl. 255—23)

This invention relates generally to rotary well drilling apparatus, and more particularly to a drive bushing for transmitting rotation from the rotary table to the string of drill pipe.

It is well known that when drilling through hard formations the drill string is subjected to torsional shocks and vibrations, which, in standard equipment, are transmitted through the kelly, kelly bushing, master bushing, and rotary table to the table drive means. The torque reversals between the driving faces of the table, master bushing, kelly bushing, and kelly, occur in such rapid succession and are of such magnitude that even with the most rugged construction the life of these parts is relatively short, and frequent replacements are necessary. The operation of the rig is also extremely noisy because of the continual hammering of the driving faces on each other.

A principal object of this invention is to provide a kelly drive in which provision is made for cushioning the torsional shocks and absorbing the vibrations set up in the drill string and kelly incidental to the drilling operation.

A more specific object is to provide a resilient kelly drive in which the torque is transmitted from the rotary table to the kelly through a cushioning member interposed between two metallic driving faces.

A further object is to provide a resilient kelly drive in which the thrust is uniformly distributed over a relatively large number of thrust faces, whereby the unit pressure on each face is reduced to such an extent that yieldable material now available may be interposed between the thrust faces.

A still further object of this invention is to provide a drive bushing in which yieldable shock-absorbing means are built into the bushing, whereby the external contour of the bushing and the shape of the opening therein may both conform to that of a conventional bushing, thereby enabling the substitution of my novel bushing for a conventional bushing without modification of the associated members.

Another difficulty experienced in connection with rotary drilling is caused by the tendency of the kelly to bind and "hang up" in the kelly bushing instead of feeding freely through the bushing as it should. This tendency to hang up naturally increases with an increase in torque input to the rotary table, inasmuch as the friction between the kelly and the kelly bushing is a direct function of the thrust between the cooperating faces of these members.

A further object of this invention is to provide a kelly bushing having kelly driving faces offering a minimum of resistance to axial movement of the kelly through the bushing.

A still further object is to provide a kelly bushing having anti-friction driving faces of such a nature that they not only offer substantially no resistance to feeding of the kelly under driving load, but they are also very effective in polishing the faces of the kelly, so that the coefficient of friction between the kelly and bushing is reduced with increased use of my novel bushing.

Yet another object is to relieve the rotary table of the radial thrust or spreading force imposed thereon by a split master bushing, by the provision of a master bushing having a one-piece outer bowl.

Other objects and advantages will be apparent from the following description of a preferred embodiment of the invention, reference being had to the accompanying drawing wherein.

Figure 1:
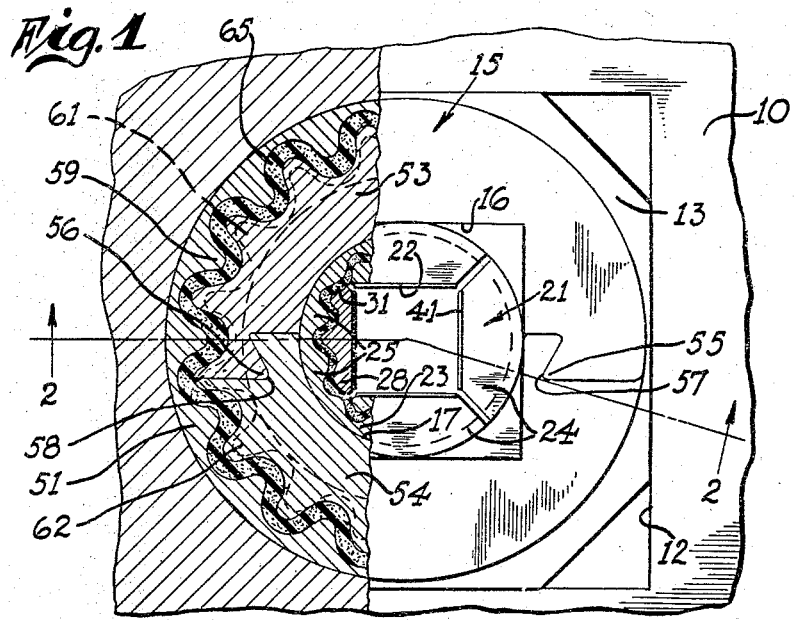
Figure 1 is a view of one embodiment of the invention, partly in top plan and partly in horizontal section substantially in the plane of section line 1—1 of Figure 2.

Before proceeding with a detailed description of a preferred embodiment of the invention, it is desired to point out that my novel resilient drive may be incorporated either in a kelly bushing or in a master bushing. In either event the bushing comprises an outer driving section shaped externally to conform to the shape of the opening in the member in which it is adapted to seat and by which it is driven, and an inner driven section having a central opening adapted to receive and transmit rotation to a driven member. As will be explained in detail hereinafter, the inner surface of the outer section and the outer surface of the inner section have cooperating thrust transmitting faces between which is interposed a layer of yieldable material which absorbs torsional shocks and vibrations.

Referring now to the drawing, reference character 10 denotes a conventional rotary table having the usual cylindrical bore 11 therein terminating in a square recess 12 at its upper end for the reception of the substantially square upper portion 13 of a master bushing indicated generally at 15. Formed centrally in the master bushing is a square recess 16 terminating in a downwardly converging frusto-conical opening 17. While connecting or disconnecting sections of drill pipe, the usual rotary slips (not shown) are adapted to seat on the conical surface 17 and wedge against the pipe to support it. During drilling, however, the slips are replaced by the kelly bushing, indicated generally at 21. The upper portion of the kelly bushing is square externally to engage the square recess in the master bushing, and be rotated thereby, and the lower portion is in the shape of an inverted frustrum of a cone to seat in the tapered seat 17 in the master bushing. The kelly bushing has a square or other non-circular opening 22 therethrough for drivingly engaging a kelly while permitting the latter to feed through the bushing. It will be seen from the foregoing that both the kelly bushing and the master bushing conform in shape to conventional bushings. Hence it will be understood that while for purpose of illustration I have shown both types of bushings as embodying the novel resilient drive, either bushing may be used in conjunction with a conventional bushing of the other type.

The kelly bushing 21 comprises a one-piece outer bowl 23 shaped to seat in the master bushing 15, and a plurality of kelly-engaging slips 24 seated in the bowl. In prior constructions the bowl usually has been formed with a square opening in which are anchored flatbacked driving slips adapted to engage the kelly. In the present instance the inner surface of the bowl has a plurality of downwardly converging corrugations 25 providing a relatively large number of thrust faces for transmitting rotative forces from the bowl to the kelly-engaging slips mounted therein.

Figure 4:
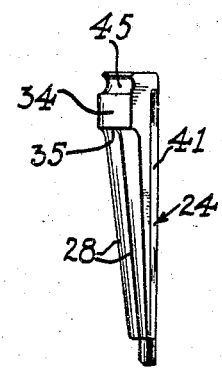
Figure 4 is a view in side elevation of one of the kelly slips.
Figure 5:
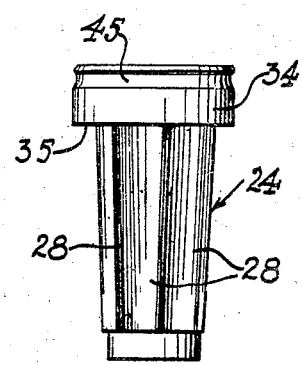
Figure 5 is an outer elevation of a kelly slip.

In the illustrative embodiment I have shown four slips 24 forming a square opening for slidably and rotatably engaging a square kelly. It will be understood, however, that a greater or lesser number of slips may be employed if desired, and that the shape of the kelly opening may be modified to conform to other than a square kelly, as, for instance, an octagonal kelly. One of the slips 24 is shown in side elevation in Figure 4, and in outer or rear elevation in Figure 5. As shown in these figures and in Figure 1, the back of each slip is formed with downwardly tapered corrugations 28 throughout the major portion of their length, the corrugations conforming to those on the inner surface of the bowl, but formed on a smaller radius than the latter, as most clearly shown in Figure 1. With this arrangement the corrugations on the slips project into the depressions between the corrugations on the bowl, thus providing in effect a multiplicity of toothed driving connections between each slip and the bowl.

A salient feature of this invention is the provision of a resilient cushioning member interposed between the corrugated backs of the slips and the internally corrugated bowl. This cushioning member is shown as a corrugated sleeve 31 of resilient plastic material such as soft rubber, Neoprene, or the like. I prefer to form the sleeve of Neoprene because of its ability to retain its properties and its original shape when exposed to oil. The sleeve is of substantially uniform thickness throughout, having corrugations on both its inner and outer surfaces corresponding respectively to the corrugations on the slips and on the bowl. The sleeve may be molded into the desired shape and inserted into the bowl, in which case it is deemed desirable to form a flange on the upper end of the sleeve bridging the spaces between the outer corrugations of the sleeve and overlying the upper ends of the corrugations on the bowl, as shown at 32 in Figs. 2 and 3.

It will be observed from Fig. 2 that the corrugations on the bowl terminate at an elevation below the upper surface of the bowl, and that above this point the opening in the bowl is cylindrical, as indicated at 33 in Fig. 3. It will also be observed from Figs. 4 and 5 that the upper portion of each slip is formed as a segment of a circle at 34. The circular portions overhanging the corrugations 28 to provide downwardly facing shoulders 35 which seat on the upper extremities of the corrugations in the bowl to limit the downward movement of the slips in the bowl. The annular flange 32 on the resilient sleeve lies between the above-mentioned shoulders and thereby absorbs any axial vibrations transmitted to the slips by the kelly and prevents their being transmitted to the outer bowl. By reason of the circular contour of the slips at 34 and the cylindrical bore 33 in the bowl, the driving connection between these members is limited to that effected through the corrugations. It is thus apparent that there is no metal-to-metal contact between torque-transmitting faces. The contact at 33 and 34 functions solely to prevent radial displacement of the slips, whereby the kelly opening is maintained constant and the slips fit sufficiently snugly about the kelly to prevent any substantial angular displacement or cocking of the kelly relative to the opening.

For the purpose of retaining the slips in assembled relation and preventing relative vertical movement between individual slips, an annular groove 45 is formed in the outer walls thereof adjacent their upper ends for the reception of a retaining ring which may be a cable 46 or other suitable retaining means.

It will be understood that by the provision of a relatively large number of torque-transmitting faces between the bowl and the slips, the effective thrust area is greatly increased and the unit pressure on the faces proportionately reduced. This reduction in unit pressure is of utmost importance in connection with a resilient drive, inasmuch as it enables the use of a highly resilient, deformable cushioning member without encountering the risk of its being displaced from between the thrust faces. As is well known, rubber and other similar materials such as Neoprene are substantially incompressible, the cushioning effect being obtained by bodily displacement or flowing of the material from a high pressure area to one at lower pressure. In the present instance, the unit pressure between the thrust faces is reduced to a point well below that which would be likely to cause excessive flow and consequent rupture of the cushioning member.

As briefly mentioned above, the kelly bushing of the present invention is characterized by the provision of kelly-engaging faces on the slips having a low coefficient of friction with the kelly, whereby the tendency of the bushing to "carry weight" is reduced to a minimum. I have found that a non-metallic facing of "Bakelite" or other non-metallic material produces highly satisfactory results, having the additional property of polishing the sides of a kelly and thereby further reducing the coefficient of friction with use. The use of a non-metallic facing is rendered feasible by the provision of the cushioning member in the bushing, the latter serving to absorb the torsional shocks and thereby greatly reducing the maximum stresses to which the facing is subjected.

Figure 2:
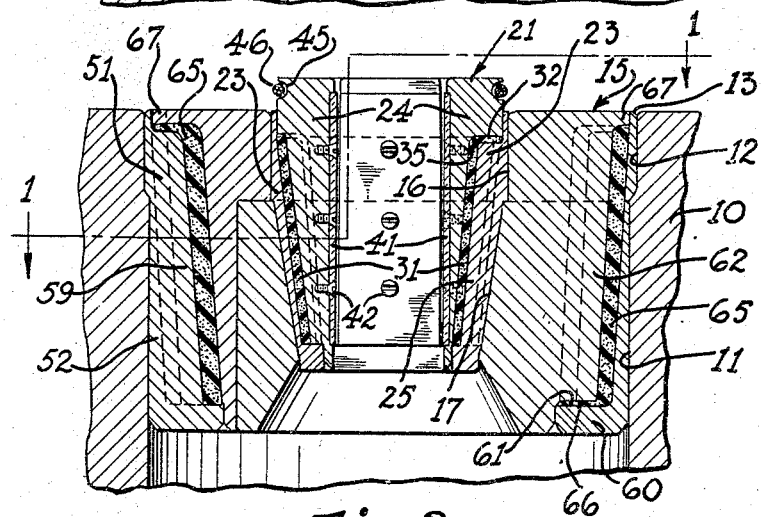
Figure 2 is a longitudinal sectional view taken on line 2—2 of Figure 1.
Figure 3:
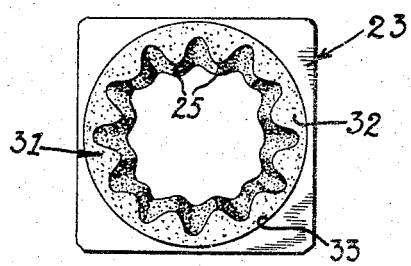
Figure 3 is a top plan view of the kelly bushing bowl of Figures 1 and 2.

In practice I prefer to form the non-metallic facing as renewable inserts 41 detachably secured to the inner faces of the slips 24 as by set screws 42, as shown in Fig. 2, or by any other suitable method. A reinforcing of fabric may be incorporated with the plastic material of the inserts, and, if desired, the material may be impregnated with graphite to increase its anti-friction and wear-resisting properties.

Another shortcoming of conventional rotary drilling equipment which is particularly noticeable in drilling very deep wells arises from the use of a split master bushing. Such bushings necessarily transmit to the rotary table all spreading forces to which they are subjected by the kelly bushing. Such forces are very large when the driving connection between the bushings is by means of a square recess in the master bushing and a cooperating square portion on the kelly bushing. Particularly at the high rotative speeds and high horsepower input to the rotary table now customary in drilling very deep wells, these spreading forces are usually greater than the rated capacity of the table. As a consequence of this, coupled with the pounding of the master bushing in the rotary table due to frequent torque reversals and vibrations reacting through the drill stem, the square recess in the table becomes enlarged and the corners of the master bushing are rounded off. As many as three replacements of the master bushing during drilling of a single well is not an uncommon occurrence.

It is not practical to make the conventional master bushing as a solid, one-piece bushing for the reason that the opening therein is not large enough to permit withdrawal of the bit therethrough when coming out of the hole. A master bushing constructed in accordance with this invention, however, and embodying the salient features of my novel kelly bushing, can be made with a one-piece outer bowl section which absorbs the spreading forces and which has an opening sufficiently large to clear the bit.

As shown in Figs. 1 and 2 of the accompanying drawing, the master bushing 15 comprises a one-piece outer bowl 51 on the upper portion of which is formed a substantially square driving portion 13 engaging the square recess 12 in the table, and a lower externally cylindrical portion 52 engaging the bore 11 in the rotary table. Mounted within the bowl 51 is a pair of complementary segmental driven sections 53 and 54 having the square opening 16 in their upper portions and the downwardly tapered frustro-conical bore 17 therebelow. The driven sections 53 and 54 are rigidly locked together against relative horizontal motion by interengagement of tongues 55 and 56 on the section 53 with reentrant grooves 57 and 58 in the section 54, the tongues and grooves together forming a single dovetailed connection, half of which is formed on each side of the bushing.

When thus locked together the two sections 53 and 54 become in effect a solid, one-piece body incapable of spreading and transmitting radial thrust to the outer bowl section and to the rotary table. The outer bowl may consequently be of much thinner section than would be necessary if it were subjected to spreading forces, and therefore the opening therein may be made sufficiently large to permit withdrawal of the bit therethrough.

The driving connection between the outer bowl 51 and the inner sections 53 and 54 is in all essential respects identical with that between the bowl 23 and the slips 24 of the kelly bushing, and hence a brief description thereof will suffice. Downwardly and inwardly tapered corrugations 59 are formed on the inner periphery of the bowl, extending from a short distance below the upper surface of the bowl to within a short distance of the lower end thereof. An inwardly extending ledge 60 extends around the base of the bowl below the corrugations 59, forming upwardly facing shoulders 61 between the corrugations providing a support for the lower ends of outwardly extending corrugations 62 formed on the outer surfaces of the segmental inner sections 53 and 54.

An internally and externally corrugated resilient sleeve 65 of rubber, Neoprene, or the like, is interposed between the corrugations on the bowl and inner sections, forming a cushioning member between the cooperating driving faces on the corrugations. Preferably, the lower extremity of the sleeve has an inwardly extending flange 66 forming a web between the lower ends of corrugations 62 and the shoulder 61 on the bowl. It is also deemed desirable to provide an outwardly extending flange 67 on the upper extremity of the inner sections to overlie and protect the corrugations against entrance of foreign matter.

From the foregoing it will be seen that I have provided a cushioned drive bushing construction which may be incorporated in either a kelly bushing or a master bushing, and in each case the exterior of the bushing is of standard dimensions whereby the bushing may be substituted bodily for a conventional bushing.

Although the members 24 are referred to in this specification and claims as "slips," it is not to be implied from the use of this terminology that these members necessarily have downwardly and inwardly tapered outer surfaces. In the particular construction shown, the corrugations 25 on the bowl and corrugations 28 on the backs of the slips converge downwardly and inwardly in order to conform in general outline to the frusto-conical seat 17 in the master bushing. In so far as the operation of the device is concerned, the corrugations could extend truly vertically. This explanation also applies to the corrugations 59 and 62 in the master bushing. These corrugations have been shown as converging downwardly in order to render the inner segments 53 and 54 more readily releasable from the outer bowl. If the corrugations were vertical, the segments would encounter resistance during the entire withdrawal operation. However, in so far as the resilient drive feature is concerned, it is not necessary that either the slips 24 or the inner surface of the master bushing be tapered as shown.

While I have shown what I now consider a preferred construction embodying the invention, it will be understood that this is solely for illustrative purposes, and that various modifications may be made within the spirit of the invention and the scope of the appended claims.

I claim:

1. In a rotary drive bushing, an outer driving member adapted to be mounted in and driven by a rotary table and having a pair of oppositely directed driving faces on its inner surface, a driven member mounted in said driving member and having a pair of oppositely directed driven faces on its outer surface opposed to said driving faces, and yieldable cushion means between each pair of opposed driving and driven faces.

2. A rotary drive bushing comprising a unitary outer member adapted to be mounted in a rotary table and having pairs of oppositely directed driving faces on its inner surface, a plurality of complementary driven segments mounted in said outer member, each segment having on its outer surface a pair of oppositely directed driven faces opposed to a pair of driving faces on said outer member, and yieldable cushion means between each driving face and the driven face opposed thereto.

3. A rotary drive bushing comprising an outer driving member adapted to be mounted in a rotary table and having a circumferential series of substantially axially extending corrugations on its inner surface, a driven member mounted in said driving member and having a complementary series of corrugations on its outer surface interlocked with the first-named corrugations, and yieldable cushion means between said two series of corrugations.

4. In a rotary drive bushing, an outer driving member adapted to be mounted in a rotary table and having a plurality of downwardly and inwardly inclined driving faces on its inner surface, a driven member mounted in said outer member and having a plurality of downwardly and inwardly inclined driven faces on its outer surface cooperating with said driving faces, and yieldable means betweeen said driving and driven faces.

5. In a rotary drive bushing, an outer driving member adapted to be mounted in a rotary table and having a plurality of downwardly and inwardly inclined driving teeth projecting radially inwardly thereof, a driven member mounted in said outer member and having a corresponding number of similarly inclined driven teeth projecting radially outwardly thereof into intermeshing engagement with said driving teeth, and a continuous sleeve of yieldable material interposed between said driving and driven teeth.

6. A kelly bushing comprising an outer bowl adapted to seat in and be driven by the master bushing of a rotary table, a plurality of kelly engaging slips mounted in said bowl, said bowl and slips having cooperating torque transmitting faces on their inner and outer surfaces respectively, and yieldable cushion means between said faces.

7. A kelly bushing comprising a unitary outer bowl adapted to be seated in and be driven by the master bushing of a rotary table, a plurality of segmental kelly engaging slips mounted in said bowl, said bowl and slips having intermeshing teeth on their inner and outer surfaces respectively, and a continuous corrugated sleeve of yieldable material interposed between the teeth on said bowl and the teeth on said slips.

8. In a kelly bushing, an outer bowl shaped externally to conform to the opening in the usual master bushing, a plurality of segmental kelly engaging slips mounted in said bowl and having inner faces defining a kelly opening, said bowl and slips having cooperating downwardly and inwardly inclined corrugations on their respective inner and outer surfaces providing a plurality of circumferentially spaced driving faces in torque-transmitting relation, and a continuous corrugated sleeve of yieldable material confined between said corrugations on the bowl and said corrugations on the slips respectively.

9. In a kelly bushing, an outer bowl adapted to seat in and be driven by a rotary table, a plurality of segmental slips mounted in said bowl and having inner faces cooperating to define a kelly opening, said bowl and slips having interengaging driving faces on their inner and outer surfaces respectively, yieldable cushioning means between said driving faces, and non-metallic anti-friction inserts detachably secured to the inner faces of said slips.

10. A rotary table master bushing comprising an outer driving member shaped externally to conform to the opening in the usual rotary table, a driven member mounted in said driving member and having a central opening therethrough shaped to receive the usual kelly bushing, said driving and driven members having cooperating driving faces on their inner and outer surfaces respectively, and yieldable cushion means between said faces.

11. A rotary table master bushing comprising an outer unitary driving member adapted to be mounted in and driven by a rotary table, a plurality of segmental driven members mounted in said driving member and having inner faces defining an opening adapted to receive a kelly bushing, said driving and driven members having cooperating driving faces on the inner and outer surfaces respectively, yieldable cushion means between said driving faces, and interlocking means on said segmental members for rigidly securing the latter in assembled relation.

12. A rotary table master bushing as defined in claim 11, in which said interlocking means comprises an axially extending tongue and groove connection between said segments.

13. A rotary table master bushing as defined in claim 11, in which said segmental driven members comprise a pair of semi-circular segments having substantially radially extending meeting faces on opposite sides of said kelly bushing opening, and in which said interlocking means comprises undercut recesses in the meeting faces of one segment and complementary tongues projecting from the meeting faces of the other segment, said tongues and grooves together forming a single dovetailed connection between the segments.

14. In a kelly bushing, an outer member adapted to be driven by a rotary table, an inner member defining a kelly opening and having kelly contacting liners of material having a low coefficient of friction with a kelly, and yieldable means interconnecting said outer and inner members in torque-transmitting relation.

15. A drive bushing for a rotary drilling table, comprising a plurality of relatively rigid liner members adapted to engage a kelly in torque-transmitting relation, an annular member surrounding said liner members and adapted to be rotated by said table, said liner and annular members having cooperating means for rigidly resisting outward radial movement of said liner members, while permitting relative rotation therebetween; resilient means, and other cooperating means on said liners and annular member cooperating with said resilient means to apply torque from said annular member to said liner members through said resilient means.

REYNOLDS B. DEXTER.